Patented Sept. 2, 1924.

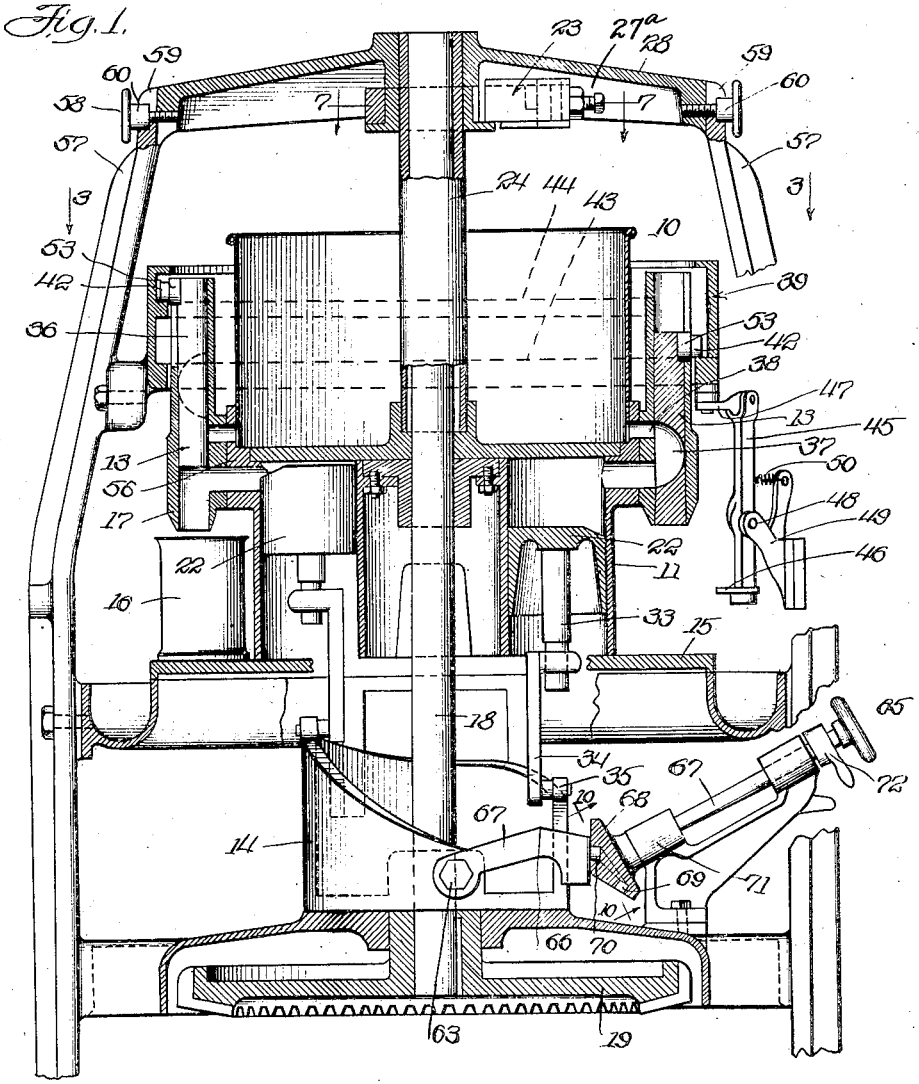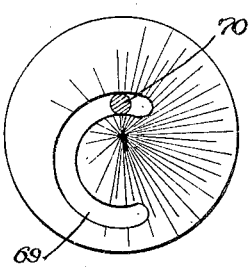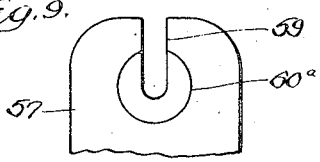

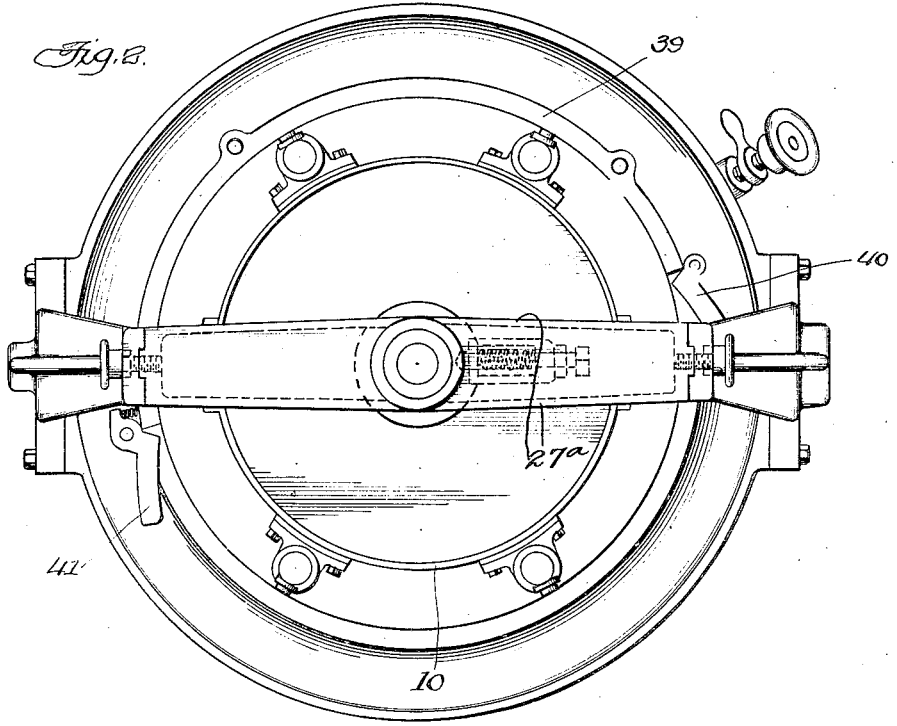
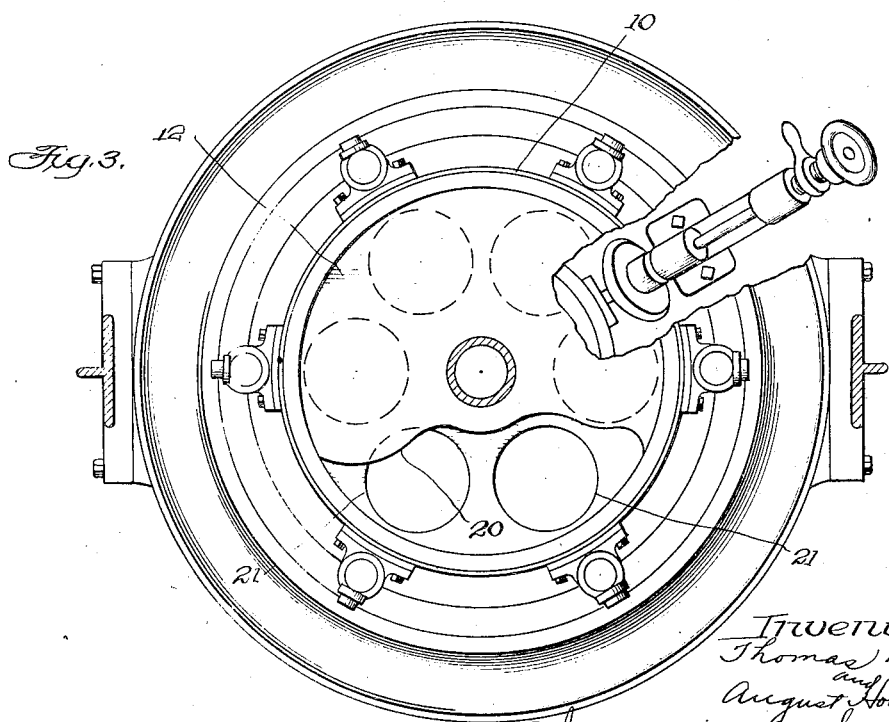

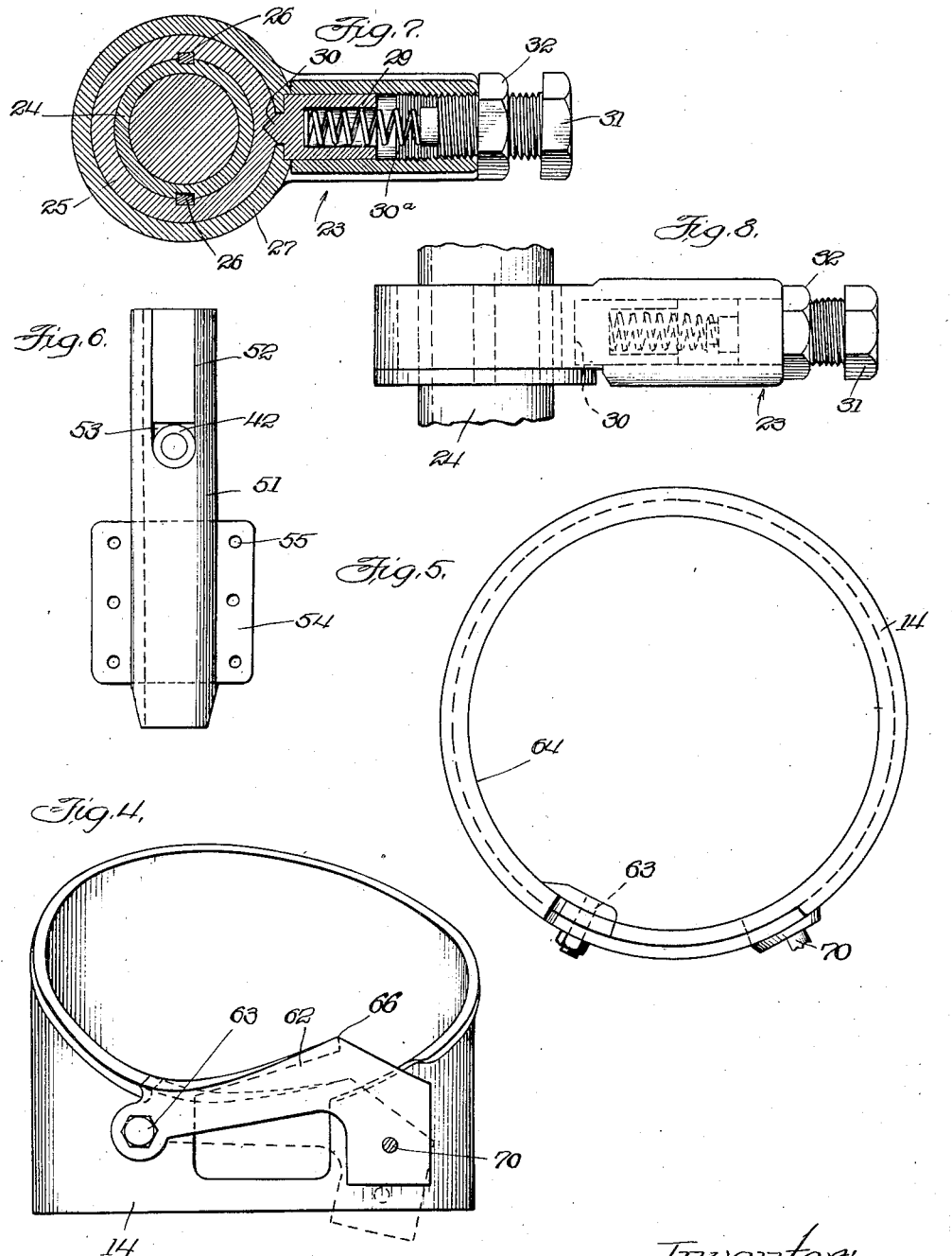

1,506,851

UNITED STATES PATENT OFFICE.

THOMAS MARTIN AND AUGUST HOLMQUIST, OF HOOPESTON, ILLINOIS, ASSIGNORS TO SPRAGUE CANNING MACHINERY COMPANY, OF CHICAGO, ILLINOIS, A CORPORATION OF ILLINOIS.

FILLING MACHINE.

Application filed May 19, 1921. Serial No. 470,985.

*To all whom it may concern:*

Be it known that we, THOMAS MARTIN and AUGUST HOLMQUIST, citizens of the United States, residing at Hoopeston, in the county of Vermilion and State of Illinois, respectively, have invented certain new and useful Improvements in Filling Machines, of which the following is a full, clear, concise, and exact description, reference being had to the accompanying drawings, forming a part of this specification.

Our invention relates to filling machines, and more specifically to filling machines for handling semi-fluid material such as cooked corn and the like.

Among the objects of our invention are to provide an improved machine of this character in which the amount of fill is adjustable.

Further objects are to provide a machine of this character which will be simple in construction, and durable and efficient in use.

In the drawings in which an embodiment of our invention is shown—

Fig. 1 is a vertical axial section of a filling machine;

Fig. 2 is a top plan view of the machine shown in Fig. 1;

Fig. 3 is a horizontal section substantially on the line 3—3 of Fig. 1, parts being omitted;

Fig. 4 is a side elevation on an enlarged scale of an adjustable cam track;

Fig. 5 is a plan view of the cam track shown in Fig. 4;

Fig. 6 is an elevational view of the valve casing and guide;

Fig. 7 is a section on the line 7—7 of Fig. 1;

Fig. 8 is a side elevation of the part shown in Fig. 7;

Fig. 9 is a fragmentary view showing the upper end of one of the frame uprights; and Fig. 10 is a view of the end of the conical cam.

The construction shown in the drawings comprises in a general way, a rotatable tank or reservoir 10, a circular series of pump devices 11, located underneath the tank 10, and rotatable therewith, a stationary cutoff plate 12, in the bottom of the tank 10, located above the pumps 11, a circular series of two-way valves 13 for controlling the discharge from the pump 11, an adjustable cam track 14 for controlling the travel of the pistons of the pumps 11, and a rotatable can turret or sweep 15 on which the cans 16 rest, and by which they are carried around underneath the discharge nozzles 17 of the pumps 11.

The tank 10, pumps 11, valves 13 and can sweep 15 are mounted to rotate as a unit with the drive shaft 18, which is driven from the bevel gear 19.

The passage of the material from the tank 10 to the pump 11 is controlled by the stationary cut-off plate 12, which is cut away as indicated at 20 in Fig. 3 to permit the material from the tank 10 to enter the cylinders 21 of the pumps 11 at a certain period in the travel of the pumps, this period being during the downward travel of the pistons 22 of the pumps.

The cut-off plate 12 is held against rotation by means of a yieldable holding device 23 (shown in detail in Figs. 7 and 8) which in the ordinary operation of the machine will hold the cut-off plate 12 against rotation, but which will yield to permit the cut-off plate 12 to rotate if unusual pressure is exerted tending to rotate the cutoff plate. The holding device 23 engages a sleeve 24, the bottom of which is secured to the cut-off plate 12, and the upper end of which sleeve is yieldingly engaged by the holding device 23. The holding device 23 comprises a collar 25 secured to the sleeve 24, by means of keys 26, and a slip-collar 27 surrounding the collar 25, and held against rotation by webs 27ª extending downwardly from the cross-arm 28 at the frame of the machine. The slip connection between the slip-collar 27 and the collar 25 is effected by means of a spring pressed catch 29, the end of which engages a notch 30 in the collar 25. The catch 29 is yieldingly pressed into engagement with the collar 25 by means of a coil compression spring 30ª which is adjustable by means of an adjusting screw 31. A locknut 32 is provided for holding the adjusting nut 31 in adjusted position.

The pistons 22 of the pump 11 are actuated by means of the piston rods 33, to the lower ends of which are secured brackets 34, on which are mounted rollers 35, which travel on the upper edge of the cam 14. This cam 14 is so designed that it will cause the pistons 22 to travel downwardly while the cylinders 21 are in communication with the tank 10, and will cause the pistons to travel upwardly during the period when the cylinders 21 are cut off from communication with the tank 10 by the cut-off plate 12.

The two-way valves 13 are so controlled in the ordinary operation of the machine that the sliding plunger 36 is in its lower position as shown at the right of Fig. 1 when the pistons 33 are descending, to fill the cylinders 21, and so that the sliding plungers 36 are in their upper position as shown at the left of Fig. 1 when the pistons 22 are being raised to discharge the material from the cylinders 21 through the discharge outlets 17 into the cans 16. A provision is made, however, which will prevent the plunger 36 from being raised in case no can is present to be filled, so that the material which has been drawn into the cylinder 21 on the downstroke of the piston 22 will be forced back into the tank 10 through the passage 37 and port 38 in case no can is present to be filled. Such a construction is shown in the application of Holmquist Serial No. 376,565, filed April 26, 1920, and will not be described in great detail in this application. However, it is here stated that this no-can no-fill construction comprises a two-way cam-track 39 having two pivoted switches 40 and 41. The switch 40 is a can-controlled switch, which is swung outwardly to a position shown at the right of Fig. 2, if no can is present to be filled, but which is swung inwardly if a can is present. If no can is present and the switch 40 is swung outwardly, the roller 42, which is secured to the plunger 36, will continue to travel on the lower track 43 of the two-way cam-track 39. As the roller 42 travels on the lower cam-track 43, the plunger 36 will not be raised, and as the piston 22 is raised, it will simply force the material above the piston through the passage 37 and port 38 back into the tank 10, If, however, a can is present in position to be filled, the switch 40 will be swung inwardly by means hereinafter described, and the roller 42 will ride upwardly on the switch 40 and travel along the upper cam-track 44, bringing the slide-valve to its upper position, shown at the left of Fig. 1. In this position, as the piston 22 travels upwardly, it forces the material out of the cylinder 21 through the discharge passage 17 into the can 16. The switch 41 is simply a pivoted track portion for guiding the roller 42 from the upper cam-track portion 44 down to the lower level. If the roller 42 is already traveling on the lower level when it comes to the switch 41, the switch 41 is simply pushed out of the way by the roller.

The movement of the switch 40 is controlled from the can by means of a lever 45 having a shoe 46 in position to be engaged by the cans, the upper end of this lever 45 being connected with the swinging switch 40 by means of a link 47. The lever 45 is pivotally mounted at 48 in a bracket 49, and a spring 50 is provided which swings the lever 45 and the pivoted switch 40 outwardly in case no can is present to engage the shoe 46.

This no-can no-fill construction is not claimed in this application, but is briefly described because it is a part of the organization.

The two-way valve construction 13 is of importance. It will be noted that this valve construction is self-contained. As shown in Fig. 6, the guide for the upper end of the valve is formed as an integral part of the casting 51 forming the valve casing. This differs from the construction shown in the Holmquist application referred to above, in which the guide for the upper end of the valve is formed as a casting distinct from the valve casing the guide casting being secured to the side of the tank. This construction shown in the Holmquist application requires that the tank be made of heavy material to support these guide castings.

In the construction of this application, however, the guide for the upper end of the valve is formed as an integral part of the valve casing. This avoids the necessity of carefully aligning two castings, which is necessary in the construction shown in the Holmquist application, and also enables the tank 10 to be made of light sheet material, as the side of the tank does not have to support the guide castings.

This combination valve casing and guide casting 51 is provided with a guide slot 52 for the upper end of the valve, the valve having a portion 53 which slides in this guide slot. The roller 42 is mounted on this portion 53 which projects into the guide slot 52. The casting 51 is provided with a base portion 54 provided with bolt holes 55, so that it can be secured to a supporting casting 56 by means of machine screws. This supporting casting 56 serves to support not only the two-way valve 13, but also the rotary tank 10 and pump 11.

In order to facilitate the removal and assembly of parts for cleaning and repair, the cross-arm or bracket 28 at the upper end of the machine is connected with the uprights 57 of the frame in such a way that it can be readily detached therefrom. This connection is effected by means of a pair of hand screws 58, the inner ends of which are screwed into the bracket 28, and the outer portions of which lie in open slots 59 in the upright frame members 57. In order to prevent any possibility of the screws 58 from slipping upwardly in the slots 59, the outer ends of the shanks of these screws are enlarged as shown at 60, and the slots 59 are provided with enlargements forming recesses 60ª (Fig. 9) to receive the enlargements 60 of the shanks of the screws 58. To disconnect the bracket 28, the screws 58 are backed off sufficiently to bring the enlargements 60 out of the recess 61 (and the bracket 28 can then be slipped upwardly) the shanks of the screws 58 slipping out of the slots 59. When the bracket 28 is thus removed, the cut-off plate 12 can be lifted out for cleaning.

Another important feature of the construction is the provision for adjusting the cam 14 to vary the travel of the piston 22, and hence the amount of material discharged into the cans. This adjustment is effected by means of a pivoted cam portion 62 which is pivoted at 63 to the main cam portion 64, and is adjustable by means of a hand-wheel 65. The construction is such that raising the pivoted cam portion 62 will decrease the amount of material supplied to the cans while lowering it will increase the amount. The amount of material which is finally discharged into the can is determined by the height to which the crest 66 of the pivoted cam 62 is adjusted. The construction is such that the roller 35 which controls the travel of the piston 22 is in engagement with the crest 66 of the pivoted cam substantially at the time when the corresponding cylinder 21 is cut-off from communication from the supply tank 10 by means of the cut-off plate 12. After this cut-off takes place no more material can be supplied to the cylinder 21 from the tank 10, and consequently the amount which is in the cylinder at that time is the amount which will be delivered to the can on the upstroke of the piston 22. It will be noted that in certain positions of the pivoted cam member 62, the roller 35 will have to travel on an upward incline before reaching the crest 66. This, however, does no harm, as it simply results in forcing some of the material which has been drawn into the cylinder 22 back into the tank 10, as communication between the cylinder and tank is not completely closed until the roller 35 reaches the crest 66.

The adjusting means for the pivoted cam portion 62 comprises in addition to the hand-wheel 65 previously described, a shaft 67 to which the hand-wheel is secured, and a conical cam member 68 secured to the shaft 67 and having a spiral groove 69 in its conical face for engagement with a pin 70 secured to the cam member 62. The shaft 67 is mounted in a bearing bracket 71, a lock-nut 72 being provided for holding the conical cam 68 in any position to which it may be turned by the handwheel 65.

The operation and adjustment of the machine has been outlined in connection with the description of the construction. The tank 10 is kept supplied with material to be filled into the cans from any suitable source of supply. The bevel gear 19 is driven from any suitable source of power. As this bevel gear rotates, it causes to rotate therewith the shaft 18, the tank 10, the series of pumps 11, the two-way valves 13, and the can sweep 15. The cut-off plate 12 is held stationary by means of the holding device 23. As the pumps 11 rotate, the pistons 22 move up and down under the control of the cam 14, drawing the material into the cylinders on the downstroke from the tank 10 past the cut-off plate 12, and on the upstroke forcing the material from the cylinders either into the cans 16 or back into the tank 10, depending on whether or not a can is in position to receive the material. To change the amount of material delivered by the reciprocation of the pistons 22, the pivoted cam member 62 is shifted up or down by means of the hand-wheel 65. This can be done without stopping the machine, simply by loosening the lock-nut 72, turning the hand-wheel 65 to move the cam member 62 up or down and then tightening up the lock-nut 72.

In case any abnormal pressure is exerted tending to rotate the cut-off plate 12 (such as might be caused by a foreign substance getting caught between the edge of one of the cylinders 21 and the edge of the cut-off plate) the holding device 23 will yield to permit the cut-off plate 12 to rotate along with the cylinders 21, thereby preventing injury to the machine, which might result if the cut-off plate were rigidly held.

Having thus described our invention, what we claim as new and desire to secure by Letters Patent of the United States is:

1. A filling machine comprising a rotatable reservoir, a series of cylinders and pistons rotatable with said reservoir, a stationary cut-off plate in said reservoir for controlling the communication between said reservoir and cylinders, a series of outlet valves, one for each cylinder for controlling the discharge therefrom, an adjustable cam for controlling the movement of said pistons and means for holding said cam in different adjusted positions to vary the amount of fill, said holding means comprising a pin on said cam, and a rotatable shaft having a conical head secured thereto, said conical head having a spiral groove therein for co-operation with said pin.

2. A filling machine comprising a rotatable reservoir, a series of cylinders and pistons rotatable with said reservoir, a stationary cut-off plate in said reservoir for controlling the communication between said reservoir and cylinders, a cam for controlling the movement of said pistons, a series of outlet valves, one for each cylinder, for controlling the discharge therefrom, each valve construction comprising a vertically-reciprocable cylindrical slide-valve, circular in cross-section, a roller secured to said valve, and a fixed cam on which said roller rides and an integral casting forming a valve casing for said valve and a guide for the upper end of said valve, said integral casting having a slot at its upper end, the connection between said roller and said slide-valve extending through and being slidable in said slot, whereby said valve is guided in its reciprocation and held from rotation in the valve casing.

3. A filling machine comprising a rotatable casting, a cylindrical sheet metal member secured to said casting and forming the sides of a reservoir, a series of cylinders mounted on said casting, pistons operating in said cylinders, a stationary cut-off plate in said reservoir for controlling the communication between said reservoir and cylinders, a cam for controlling the movement of said pistons, a series of outlet valve constructions, one for each cylinder, for controlling the discharge therefrom, each valve construction comprising a vertically-reciprocable cylindrical slide-valve, circular in cross-section, a roller secured to said valve, and a fixed cam on which said roller rides and an integral casing forming a valve casing for said valve and a guide for the upper end of said valve, said integral casting having a slot at its upper end, the connection between said roller and said slide-valve extending through and being slidable in said slot, whereby said valve is guided in its reciprocation and held from rotation in the valve casing.

4. A filling machine comprising a central rotatable shaft, a frame having two uprights located on opposite sides of said shaft, each of said uprights having an open-ended vertical slot therein, a rotatable reservoir, secured to rotate with said shaft, a series of cylinders and pistons rotatable with said reservoir, a stationary cut-off plate in said reservoir, for controlling the communication between said reservoir and cylinders, said cut-off plate having a central opening through which said shaft extends, a cross-bar extending between said uprights and provided with a bearing for said shaft, and a quick-detachable connection between the ends of said cross-arm and upright, comprising a pair of screws, one for each upright, the shanks of said screws lying in said slot, whereby the cross-arm can be quickly detached from said uprights by slacking up the screws and lifting the cross-arm out without completely unscrewing the screws, the shanks of said screws having an enlarged portion, and each upright having a recess adjacent the slot into which said enlargement extends.

In witness whereof, we have hereunto subscribed our names.

THOS. MARTIN.
AUGUST HOLMQUIST.